Feb. 20, 1951 M. P. GUSSACK 2,542,247
SPRING LOCKING MEANS FOR A STOP PIN IN A SLIDING BRACKET
Filed Nov. 7, 1950
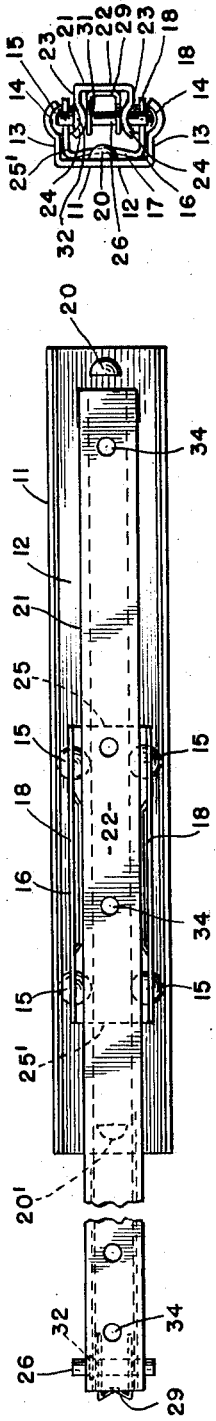
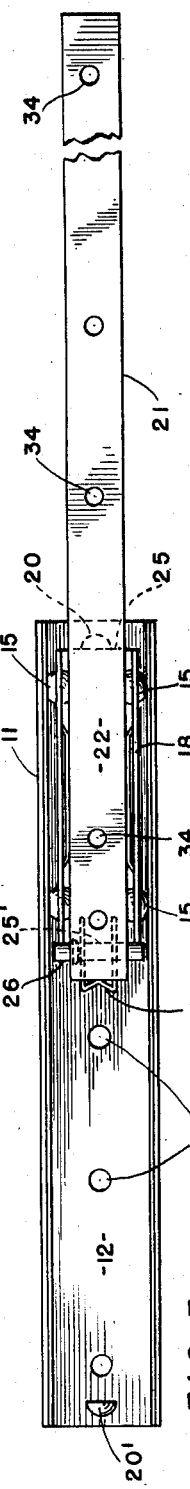
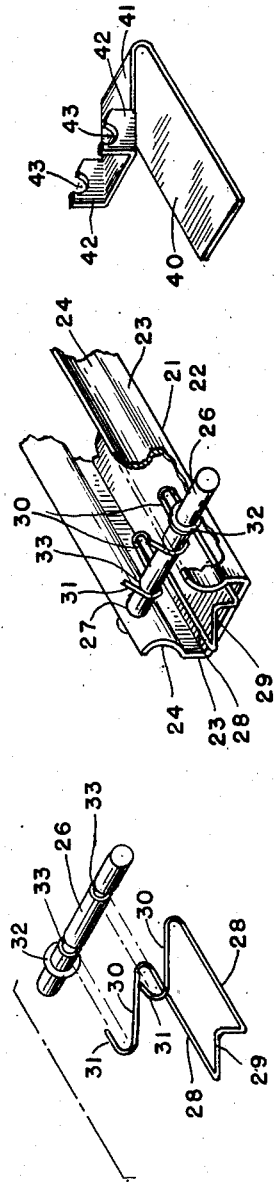
INVENTOR
MILTON P. GUSSACK,
BY
ATTORNEY Patented Feb. 20, 1951

2,542,247

UNITED STATES PATENT OFFICE 2,542,247

SPRING LOCKING MEANS FOR A STOP PIN IN A SLIDING BRACKET

Milton P. Gussack, Flushing, N. Y., assignor to Grant Pulley & Hardware Co., Woodside, N. Y.

Application November 7, 1950, Serial No. 194,517

4 Claims. (Cl. 308—3.8)

This invention relates to an attachment for sliding brackets used for supporting drawers and the like and has particular reference to an improved and easily detached stop-pin for sliding bracket supporting members as set forth in Letters Patent issued to Nathan A. Gussack and numbered 2,534,350.

An object of this invention is the provision therein of an easily removable slip-in stop-pin, which, when in place upon the sliding member of the bracket, will limit the outward or extended movement of the said sliding member.

Another object of this invention is the provision therein of a removable spring element engageable with the stop-pin and sliding member to lock the stop-pin in position.

A further object of this invention is the provision therein of a stop-pin element which is readily accessible and easily removable to permit the complete withdrawal of the sliding bracket member from the stationary portion of the sliding bracket.

Heretofore, a stop-pin having a threaded end was screwed into the sliding member and required the use of a screw driver or other suitable tool for removal. With the limited space provided, this was a tedious and difficult operation. However, with the improved spring locked stop-pin herewith described, the pin removing operation becomes a simple matter.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 1 is an elevational side view of a sliding drawer supporting bracket and includes the removably spring held stop-pin forming the feature of this invention and shows the sliding member of the supporting bracket in a retracted position.

Fig. 2 is an end view looking toward the end at the left of the drawing of Fig. 1.

Fig. 3 is a view similar to Fig. 1 but showing the sliding member fully extended.

Fig. 4 is a perspective view (enlarged in scale), of the improved removable pin which is employed as a stop-member and includes a removable spring locking clip.

Fig. 5 is an enlarged fragmentary perspective view of the end portion of the sliding member showing the stop-member and holding spring in place, and has a part broken away, and Fig. 6 shows, in perspective, a modified form of locking spring.

Referring in detail to the parts, 11 designates an elongated stationary channeled member having an attachment wall 12 and angularly extending side walls 13 which are formed, throughout their length with grooves 14 forming a race-way for ball-bearings 15. Longitudinally movable within the channeled member 11 is a ball-bearing carrier element 16 having a side wall 17 and angularly extending flanges 18 in which orifices are provided to receive the said ball bearings 15. The said stationary channeled member 11 is provided with orifices 19 through which screws (not shown) are engageable and may be employed to attach the said stationary channeled member to the frame or side walls of a cabinet (not shown). The said stationary channeled member 11 is also provided, at both ends, with offset elements 20 and 20' which act as a stop to limit the movement of the ball-bearing carrier element 16 which has longitudinal movement in a forward or rearward direction.

A secondary or sliding elongated channeled member 21, formed with a side wall 22 and angularly extending flanges 23 engages within the stationary channeled member 11 and is mounted and held upon the ball-bearing carrier 16. The ball-bearings 15 upon the carrier 16 engage within grooves 24 upon the flanges 23 and form a race-way complementary to the race-way formed by the grooves 14 upon the angular flanges 13. The engagement of the ball-bearings within the opposed adjacent grooves upon the stationary channeled member and the sliding channeled member act to hold the parts together and permit a rolling movement of the sliding channeled member within the stationary channeled member. When the said sliding channeled member is extended outwardly, as shown in Fig. 3, the outward movement is limited by the offset 20 which forms a stop engageable with the forward end 25 of the ball-bearing carrier 16, and by a stop-pin 26 which engages through orifices 27 in the flanges 23 of the channeled sliding member 21 and contacts the edge 25' of the channeled ball-bearing carrier (Fig. 3) when the said channeled sliding member is fully extended.

The stop-pin 26 engages loosely through said orifices 27 in the sliding member 21 but is held securely in place by means of a spring clip element having base legs 28 connected at one end by the cross connection 29 and having upwardly turned end legs 30 with hooked ends 31. A shoulder 32 formed upon the stop-pin 26 fixes the position of the stop-pin in the orifices 27 and annular grooves 33 are formed in the stop-pin in which the hooked ends 31 formed upon the spring clip engage. The said spring clip is easily forced between the stop-pin and the wall 22 of the sliding member 21 until the hooked ends 31 engage within the annular grooves 33 upon the stop-pin 26. The spring pressure upon the stop-pin is sufficient to hold the hooked ends of the spring clip in the annular grooves upon the stop-pin and thereby hold it in place.

The sliding member 21 is formed with orifices 34 through which screws (not shown) engage and afford a means for attaching the sliding member 21 to the side of a drawer.

The spring clip illustrated in Fig. 4 may be made of any suitable spring wire while in Fig. 6 there is shown a modified form of spring clip. In this form the clip comprises a flat or leaf spring base 40 having an upwardly inclined section 41 and ears 42 formed with notches 43 which are adapted to engage in the annular slots 33 of the stop-pin 26.

If, for any reason, it is desired to remove the sliding channeled member 21 with its attached drawer or shelf from its coacting stationary channeled member 11, the spring clip is readily pulled out and the stop-pin easily removed thereby allowing sliding channeled member to be withdrawn from the stationary channeled member.

In Fig. 1, the sliding channeled member, as shown, is not fully retracted. When, however, same is fully retracted, the edge 25' of the ball-bearing carrier 16 contacts the stop 20'.

I claim:

1. In combination with slide bracket supporting members comprising a stationary channeled member, a sliding channeled member engaging within the said stationary channeled member and ball bearings disposed between the said stationary and sliding members and coacting therewith, of a stop-pin removably mounted at one end of the said sliding channeled member and extending through orifices in the sliding channeled member, the said stop-pin having annular grooves formed thereon, and a spring clip mounted in said sliding channeled member and comprising a U-shaped continuous wire formed with extending legs upwardly turned intermediate their ends and having hook formations at their free ends which engage in the annular grooves upon the pin to lock same securely in position.

2. In combination with slide bracket supporting members as set forth in claim 1, wherein the stop-pin is formed with a shoulder, engageable with the sliding channeled member to fix the position of the inserted pin.

3. In combination with slide bracket supporting members comprising a stationary channeled member, a sliding channeled member engaging within the said stationary channeled member and ball bearings disposed between and coacting with the said stationary and sliding channeled members, of a stop-pin having annular grooves therein and removably mounted at one end of the said sliding channeled member and extending through orifices in the said sliding channeled member, and a V-shaped leaf spring engageable between the said pin and sliding channeled member and having upwardly extending notched ears, the said notched ears engageable in said annular grooves upon the said stop-pin.

4. The combination with slide bracket supporting members comprising a stationary channeled member, a sliding channeled member engageable with the said stationary channeled member and ball-bearings disposed between and coacting with the said stationary and sliding channeled members, of a stop-pin having annular grooves therein and engaging in orifices at one end of the said sliding channeled member, and a spring clip engageable between the said stop-pin and sliding channeled member and having a tension contact between the said stop-pin and sliding channeled member, the said spring clip adapted to grip the said stop-pin to hold it in place.

MILTON P. GUSSACK.

REFERENCES CITED

The following references are of record in the file of this patent:

UNITED STATES PATENTS

| Number | Name | Date |
|---|---|---|
| 2,267,043 | Premo | Dec. 23, 1941 |
| 2,346,167 | Jones | Apr. 11, 1944 |